United States Patent [19]

Broussely

[11] 4,129,691

[45] Dec. 12, 1978

[54] ORGANIC SOLVENT ELECTROLYTES FOR HIGH SPECIFIC ENERGY PRIMARY CELLS

[75] Inventor: Michel Broussely, Poitiers, France

[73] Assignee: Saft-Societe des Accumulateurs Fixes et de Traction, Romainville, France

[21] Appl. No.: 869,253

[22] Filed: Jan. 13, 1978

[30] Foreign Application Priority Data

Jan. 19, 1977 [FR] France ................ 77 01434

[51] Int. Cl.² .......................................... H01M 6/14
[52] U.S. Cl. ................................ 429/197; 429/220; 429/221
[58] Field of Search ................ 429/197, 220, 221; 252/62.2

[56] References Cited

U.S. PATENT DOCUMENTS

| | | | |
|---|---|---|---|
| 3,681,144 | 8/1972 | Dey et al. | 429/197 |
| 3,796,604 | 3/1974 | Gabano et al. | 429/197 |
| 3,853,627 | 12/1974 | Lehmann | 429/197 X |
| 3,960,595 | 6/1976 | Lehmann et al. | 429/197 |
| 3,996,069 | 12/1976 | Kronenberg | 429/197 |

Primary Examiner—Charles F. Lefevour
Attorney, Agent, or Firm—Kenyon & Kenyon, Reilly, Carr & Chapin

[57] ABSTRACT

Electrolytes for use in lithium primary cells are made from a mixture of three organic solvents and an alkaline solute. The first solvent is chosen to have a dielectric constant greater than 35 (e.g. propylene carbonate), the second solvent is a linear polyether with its ether functional groups in the $\gamma$ position (e.g. 1-2 dimethoxyethane) and the third solvent has a high solvation power for dissolving large quantities of the alkaline salt (e.g. 1-3 dioxolane). The solvents are so chosen that the conductivity maxima of the electrolytes that would be obtained by mixing the solvents in pairs are higher than the conductivity maxima of the electrolytes that would be obtained by using each of the solvents on its own. The positive electrode cell using the electrolyte may be cupric oxide or ferrous disulphide.

6 Claims, 6 Drawing Figures

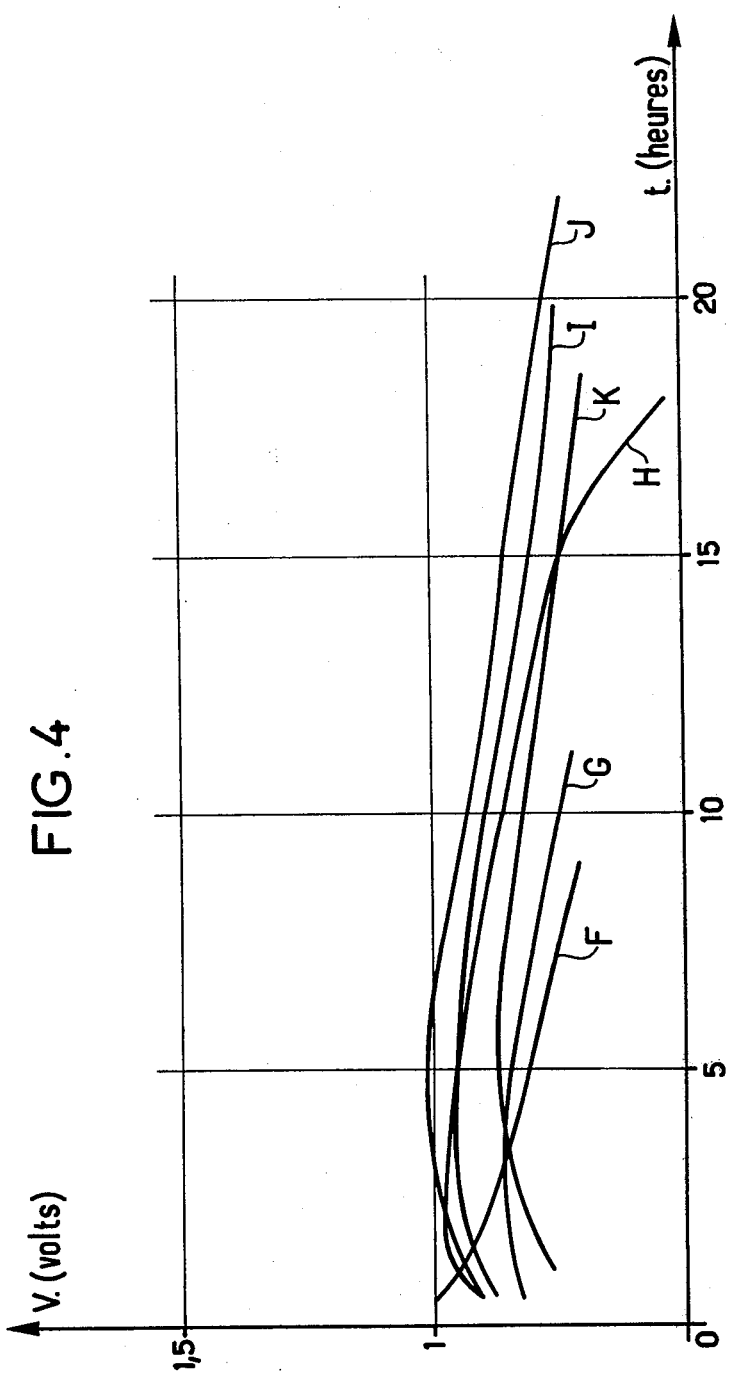

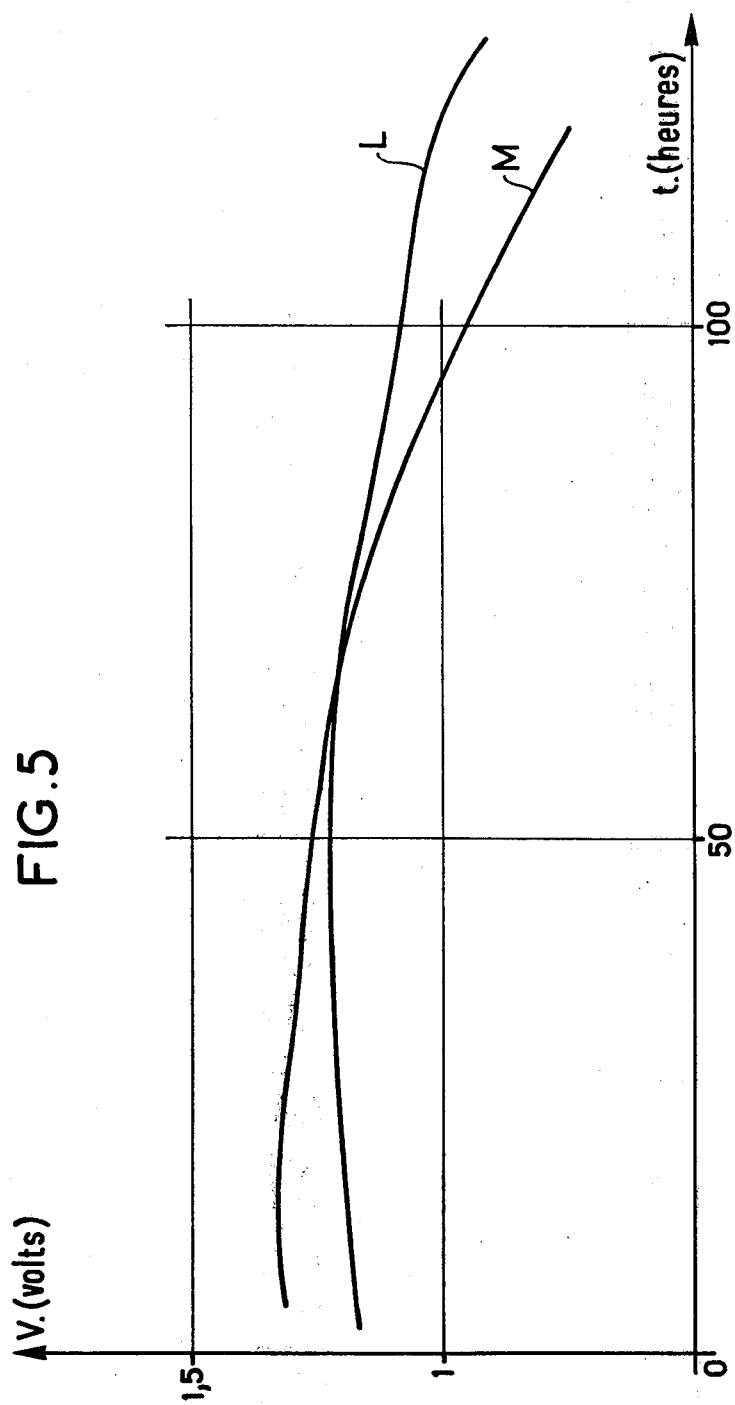

ORGANIC SOLVENT ELECTROLYTES FOR HIGH SPECIFIC ENERGY PRIMARY CELLS

BACKGROUND OF THE INVENTION

1. Field of the Invention

The present invention relates to electrolytes containing aprotic organic solvents for use in high specific energy primary cells and, in particular, for lithium cells. Such electrolytes comprise one or several aprotic organic solvents which are compatible with lithium, and a solute in the form of an alkaline salt, such as lithium perchlorate, lithium hexafluoroarsenate, lithium hexafluorophosphate, lithium tetrafluoroborate, and so forth.

2. Description of the Prior Art

It has been noted previously that electrolytes having a solvent which is composed of a mixture of two organic substances, preferably a cyclic ether and an ester or a cyclic ether and a linear ether, may have higher conductivities than electrolytes having a solvent which is composed of a single organic substance at the same concentration of solvent. (See French Pats. Nos. 1,579,466, 2,054,736 and 2,176,568; respective U.S. equivalents: U.S. Pat. Nos. 3,511,716, 3,701,688 and 3,960,595.) This mixture has made it possible to use ethylene carbonate, which is solid at ordinary temperatures, as a solvent. It is also possible, however, that a mixture of two solvents will give only an additive effect, without increasing the conductivity (as the case of mixtures of tetrahydrofuran and dioxolane, for example), or even that the conductivity of the mixture is lower than that which would have been calculated knowing the proportions of the solvents and the conductivities of the pure solvents. For example, ether oxide has this effect with tetrahydrofuran, or acetic anhydride with dioxolane. The choice of solvents for composing the mixture is thus both important and difficult to predict in advance.

SUMMARY OF THE INVENTION

The conductivity of electrolytes having several solvents whose mixture gives an increase in conductivity can be further improved by means of the present invention, which provides an improved electrolyte for lithium primary cells. The electrolyte comprises a mixture of a plurality of aprotic organic solvents which are compatible with lithium, and a solute which is an alkaline salt, wherein the organic solvents are three in number, of which the first is chosen from the category of solvents having a dielectric constant equal to or greater than 35, the second from the category of linear polyethers whose ether functional groups are in the $\gamma$ position, and the third from the category of solvents having a high solvation power for dissolving large quantities of an alkaline salt, the solvents of the three categories being such that the conductivity maxima of electrolytes prepared from mixtures of the solvents in pairs are higher than the conductivity maxima of electrolytes prepared from each of the solvents alone.

It has been observed that molar solutions of an alkaline salt such as lithium perchlorate prepared from such ternary mixtures have conductivities which are higher than those of electrolyte solutions obtained by mixing any pair of the three solvents. It has also been observed that the conductivity maxima of these binary solutions are lower than the maximum of the ternary solution.

The proportions of solvents which give the highest conductivities lie between 20 and 60% of each component, by volume, depending on the solvents used. Within this range, the conductivity maxima of these solutions generally do not vary much with proportion.

Among the possible first solvents, propylene carbonate and ethylene carbonate are preferred.

Among the possible second solvents, the dimethylether group with 1-2 dimethoxyethane is the first choice; the second group also includes dimethylether of diethylene glycol and dimethylether of triethylene glycol.

1-3 dioxolane is advantageously used as the third solvent.

BRIEF DESCRIPTION OF THE DRAWINGS

The invention will be better understood with the help of the following examples illustrated in the accompanying drawings in which:

FIG. 4 shows the discharge curves, $V = f(t)$, of electric cells containing electrolytes in accordance with the invention, as well as of cells containing the corresponding binary electrolytes and the corresponding single-solvent electrolytes; and FIG. 5 shows the discharge curves, $V = f(t)$, of two electric cells in accordance with the invention operating under different conditions than those of FIG. 4.

DETAILED DESCRIPTION OF THE PREFERRED EMBODIMENTS

Figure 1:
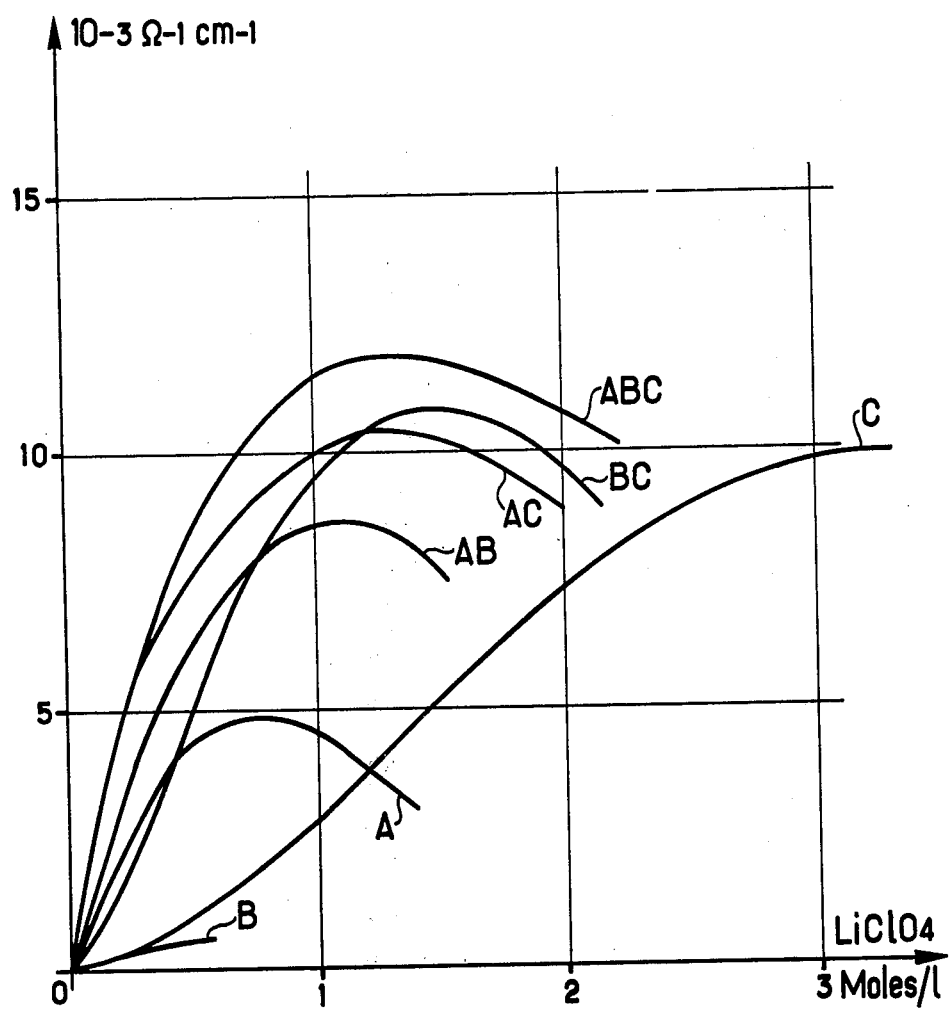
FIG. 1 is a graph showing, as a function of solute concentration, the conductivity curves of a ternary electrolyte in accordance with the invention, as well as conductivity curves of several binary electrolytes obtained from the solvents of the ternary electrolyte and conductivities of electrolytes obtained from each solvent alone.

The first examples concern the conductivity of ternary electrolytes in accordance with the invention, in comparison with the conductivity of electrolytes obtained from each solvent of the ternary electrolytes used by itself and with the same solvents mixed in pairs (binary electrolytes). The solute in all these electrolytes is lithium perchlorate. In FIG. 1 the X-axis shows the concentration in moles per liter of lithium perchlorate and the Y-axis shows the conductivity of the electrolytes in $10^{-3} \Omega^{-1} cm^{-1}$.

For curve A, the solvent is propylene carbonate (PC) which has a dielectric constant of 64. For curve B the solvent is dimethylether of diethylene glycol (DMDG), which is a linear polyether in which the ether functional groups are in the $\gamma$ position. For curve C, the solvent is dioxolane (DO), which is a cyclic ether having a high solvation power.

The curve AB shows the conductivities of binary electrolytes in which the solvent is an equal volume mixture of PC and DMDG. It can be seen that it is above the curves A and B. The curve AC shows the conductivities of binary electrolytes in which the solvent is an equal volume mixture of PC and DO. Its conductivity maximum is situated above those of the curves A and C. The curve BC shows the conductivities of binary electrolytes in which the solvent is an equal volume mixture of DMDG and DO. Its maximum also is situated above the maxima of B and C.

The curve ABC corresponds to ternary electrolytes in accordance with the invention in which the solvent is an equal volume mixture of PC, DMDG and DO. It can be seen that curve ABC is above the curves AB, AC and BC.

Analogous curves were obtained by replacing the DMDG by dimethylether of triethylene glycol (DMTG). In that case, the ternary mixture PC-DMTG-DO, with volume proportion of 1:0.5:1, gave a conductivity of $11 \times 10^{-3} \, \Omega^{-1} \text{cm}^{-1}$ for a 1M solution of $LiClO_4$, a conductivity close to that of the electrolyte of curve ABC.

Figure 2:
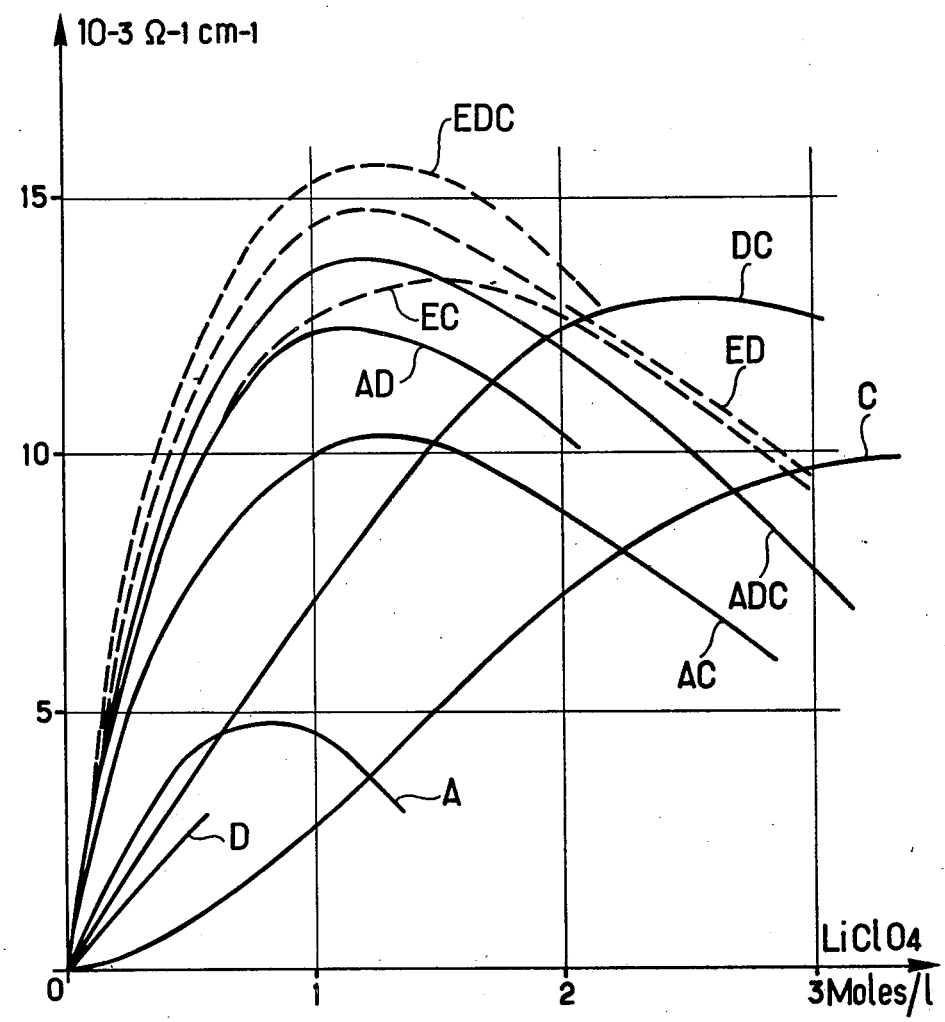
FIG. 2 is a graph analogous to that of FIG. 1, showing the conductivity curves of two ternary electrolytes according to the present invention, the conductivity curves of the corresponding binary electrolytes, and the conductivity curves of the corresponding single-solvent electrolytes.

In the same manner, FIG. 2 shows the conductivities of two other examples of electrolytes in accordance with the invention, as well as of the corresponding single-solvent electrolytes and the corresponding binary solvent electrolytes.

In this figure, the curve A again shows the conductivities of electrolytes in which the solvent is PC, and the curve C shows the conductivities of electrolytes in which the solvent is DO. Likewise, the curve AC shows conductivities of electrolytes in which the solvent is an equal volume mixture of PC and DO. The curve D shows the conductivities of electrolytes in which the solvent is 1-2 dimethoxyethane (DME), which is a linear polyether having ether functional groups in the $\gamma$ position.

The curve AD shows the conductivities of binary electrolytes in which the solvent is an equal volume mixture of PC and DME. It is noticeably higher than the curves A and D. The curve DC shows the conductivities of electrolytes in which the solvent is an equal volume mixture of DME and DO, and it is situated above the curves D and C.

Finally, the curve ADC shows the conductivities of ternary electrolytes in accordance with the invention in which the solvent is an equal volume mixture of PC, DME and DO. It can be seen that not only is its maximum situated above those of the curves AC, AD and DC, but also that it is situated further to the left than the highest maximum of these curves, i.e., that it is obtained for a lesser concentration of lithium perchlorate. This is additionally advantageous because lithium perchlorate is an expensive substance.

The curves in dashed lines in FIG. 2 show the conductivities of electrolytes where the propylene carbonate has been replaced with ethylene carbonate (EtC). The conductivities of a single-solvent electrolyte corresponding to EtC has not been shown, since this material is solid at ambient temperatures. The curve EC shows the conductivities of electrolytes in which the solvent is an equal volume mixture of EtC and DO; the curve ED shows the conductivities of electrolytes in which the solvent is an equal volume mixture of EtC and DME. The maxima of these curves are well above those of the curves D and C.

The curve EDC shows the conductivities of ternary electrolytes in accordance with the invention where the solvent is composed of an equal volume mixture of EtC, DME and DO. It has its maximum situated above the curves EC, ED and DC.

It can be seen in all these examples that the conductivities of electrolytes in accordance with the invention are higher than those of the corresponding binary electrolytes known in the prior art, at least for lithium perchlorate in concentrations below 2M.

These curves are given for equal volume mixtures of the solvents, but similar results have been obtained by taking, for example, mixtures of 25% PC, 50% DME and 25% DO (the percentages are volume percentages) with a conductivity maximum of $14.5 \times 10^{-3} \Omega^{-1} \text{cm}^{-1}$, i.e., even higher than the conductivity maximum for a mixture of equal volume of solvents. The same is true for mixtures where EtC replaces PC, since the conductivity maximum of the 25—50—25 mixture is again slightly higher than that of the equal volume mixture.

Analogous results have also been obtained by replacing the lithium perchlorate with lithium hexafluoroarsenate, giving conductivity maxima which are even higher. In this case, the equal volume mixtures of PC, DME and DO gave a maximum of $17 \times 10^{-3} \Omega^{-1} \text{cm}^{-1}$ for a 1.10 molar concentration and the equal volume mixtures of EtC, DME and DO gave a maximum of $17.5 \times 10^{-3} \Omega^{-1} \text{cm}^{-1}$ for the same concentration.

By contrast, tests performed with lithium trifluoromethane sulfonate gave maxima which were noticeably lower, being around $5 \times 10^{-3} \Omega^{-1} \text{cm}^{-1}$, but the ternary electrolytes in accordance with the invention continued to have a net advantage over the binary or single-solvent electrolytes.

Figure 3:
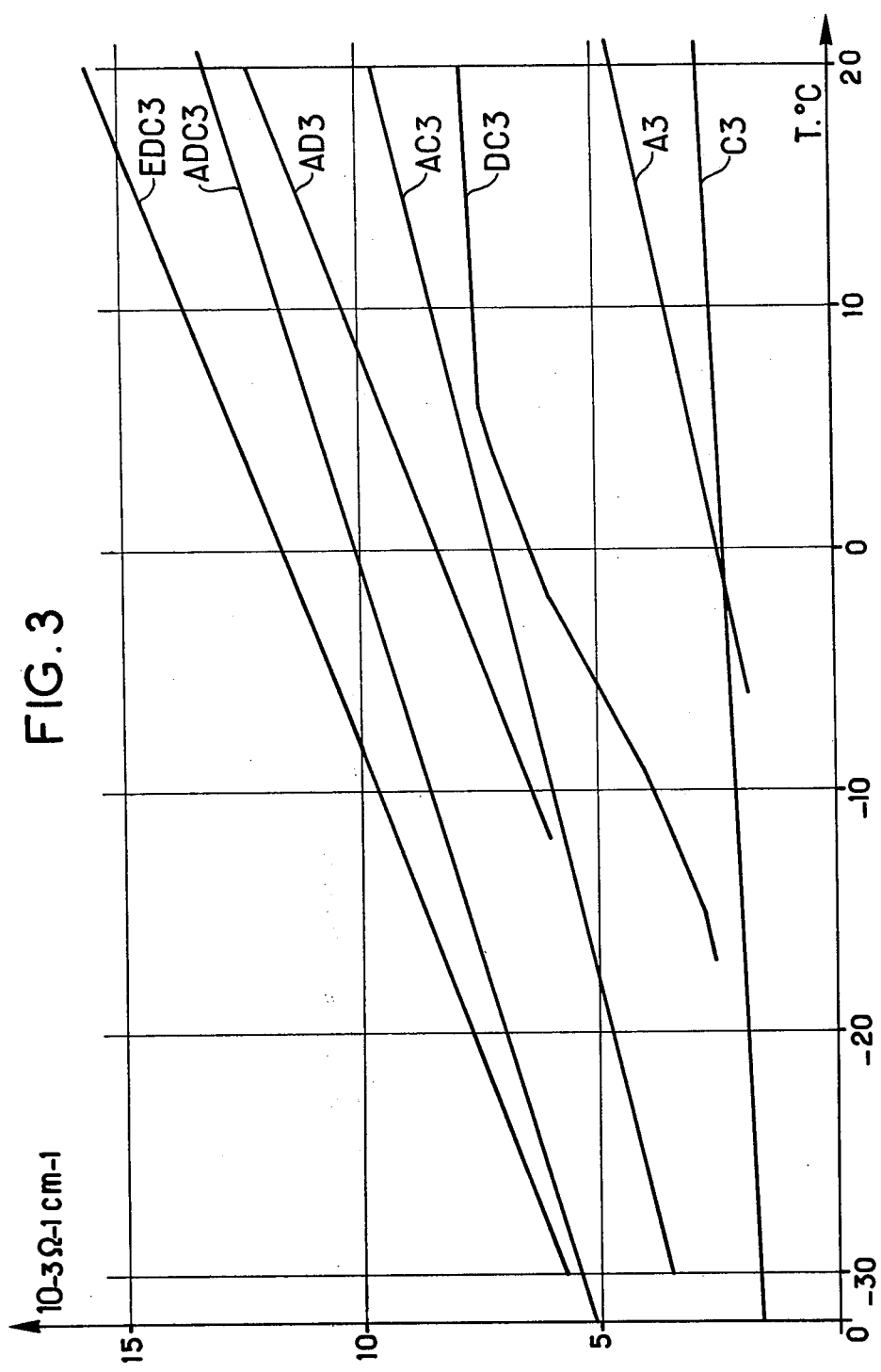
FIG. 3 shows the conductivity curves of two electrolytes in accordance with the invention as a function of temperature T (°C), as well as those of the corresponding binary electrolytes and single-solvent electrolytes.

FIG. 3 shows the temperature variations of the conductivity of electrolytes in which the solute is lithium perchlorate at a concentration of 1M. Conductivity is shown along the Y-axis in units of $10^{-3} \Omega^{-1} \text{cm}^{-1}$ and temperature along the X-axis in degrees centigrade.

The curve A3 corresponds to an electrolyte in which the solvent is PC, and the curve C3 corresponds to an electrolyte in which the solvent is DO. The curves DC3, AC3 and AD3 correspond to binary electrolytes in which the solvent constitutes equal volume mixtures of DME-DO, PC-DO and PC-DME, respectively. The binary electrolytes as a whole give higher conductivities than those of the single-solvent electrolytes. The curves ADC3 and EDC3 represent the conductivities of two electrolytes in accordance with the invention where the solvents constitute equal volume mixtures of PC-DME-DO and EtC-DME-DO, respectively. It is clear that the conductivities of the electrolytes in accordance with the invention, which are already higher at ordinary temperatures, remain higher down to extremely low temperatures.

FIG. 4 relates to the discharging of cells which were all assembled in the same way and differ only in their electrolyte solvent. They are cylindrical cells of 13.7 mm diameter and 22.9 mm height. In each cell, an annular cathode, adjacent to the can, is composed of a mixture of cupric oxide CuO with 7% graphite in such a quantity that its theoretical capacity is 1.3 Ampere-hours (Ah). A lithium anode, of tubular form, has an initial area, beside the separator, of 3.3 cm². The separator between the anode and cathode is a felt of glass fibres. The electrolytes in the cells are 1.25 M solutions of lithium perchlorate.

The cells are discharged through a resistance of 30 ohms, which corresponds to an average current density of about 9 mA/cm². The curves show the discharge time in hours along the X-axis and the tension V in volts along the Y-axis.

In FIG. 4, curve F corresponds to the discharge of a cell in which the electrolyte solvent is pure dioxolane (DO). Curve G shows the discharge of a cell in which the electrolyte solvent is an equal volume mixture of propylene carbonate (PC) and dioxolane, and curve H shows the discharge of a cell in which the electrolyte solvent is an equal volume mixture of propylene carbonate and 1-2 dimethoxyethane. Both of these cells are discharged for a longer time than the single solvent cell.

Curve K corresponds to the discharge of a cell containing a ternary electrolyte in accordance with the invention in which the solvent has the following composition (by volume) PC = 60%, DME = 20%, and DO = 20%. For curve I, the electrolyte solvent is composed of the same substances, but mixed in equal volumes. The curve J is given by a cell where the electrolyte solvent has the following composition: PC = 20%, DME = 20% and DO = 60%. The curve of a cell where the electrolyte solvent is a mixture of PC = 20%, DME = 60% and DO = 20% has not been shown but it would fall, practically to the end, in between I and J. Taking the terminal voltage as 0.75 volts, the discharge efficiencies are 44.6% for I, 44.7% for J, and 39.7% for the cell in the last-mentioned electrolyte. It can be seen, particularly with curves I and J, that the cells in accordance with the invention give better results than the cells using single-solvent electrolytes (15.4% efficiency) or binary-solvent electrolytes (21% and 34%, respectively).

It should be noted that discharging through a 30 ohms resistance represents extremely harsh discharge conditions, and that the tensions and discharge capacities are low under such conditions. By replacing the lithium perchlorate in the electrolytes in accordance with the invention with 1M lithium hexafluoroarsenate in the equal volume mixture of EtC—DME—DO, a discharge curve comparable to curve I was obtained under the same conditions (52.6% efficiency).

For FIG. 5, cells analogous to those which were used for making FIG. 4 were prepared, but replacing the cupric oxide with ferrous disulfide $FeS_2$. With electrolytes in accordance with the invention and in particular with equal volume PC—DME—DO electrolytes in which 1.25M lithium perchlorate has been dissolved, these cells give discharge curves which are little different from that which was obtained using cupric oxide. FIG. 5 shows the discharge curves of such cells through a 120 ohm resistance (curve M) in comparison with the discharge curve of cupric oxide cells through the same resistance (curve L). It can be seen that while the discharge capacity of the iron bisulphide cells is a little lower than that of the cupric oxide cells, the voltage level is, in contrast, slightly higher. The electrolytes in accordance with the invention are thus quite usable with cells having ferrous disulphide positive electrodes.

Without going beyond the scope of the invention any element could be replaced by an equivalent element.

I claim:

1. An electrolyte for lithium primary cells, comprising a mixture of three aprotic solvents which are compatible with lithium and a solute which is an alkaline salt, the first solvent being chosen from a first group of esters having a dielectric constant equal to or greater than 35, the first group consisting of propylene carbonate (PC) and ethylene carbonate (EC), the second solvent being chosen from a second group of linear polyethers in which the ether functional groups are in the $\gamma$ position, the second group consisting of 1-2 dimethoxyethane (1—2 DME), dimethylether of diethylene glycol (DMEDG), and dimethylether of triethylene glycol (DMETG), and the third solvent having a high solvation power for dissolving large quantities of an alkaline salt and consisting of 1-3 dioxolane (DO), the solvents of the three groups being such that the conductivity maxima of electrolytes obtained by mixing the solvents in pairs are higher than the conductivity maxima of electrolytes obtained from each of the corresponding solvents alone.

2. An electrolyte according to claim 1, wherein said solvents are in volume proportions lying between 20% and 60% of the first solvent, 20% and 60% of the second solvent and 20% to 60% of the third solvent.

3. An electrolyte according to claim 1, wherein the solute is chosen from the group: lithium perchlorate, lithium hexafluoroarsenate and lithium trifluoromethane sulfonate.

4. A high specific energy electrochemical primary cell comprising a lithium negative electrode, a positive electrode and an electrolyte which is an electrolyte according to claim 1.

5. A cell according to claim 4, wherein the active material of the positive electrode is cupric oxide.

6. A cell according to claim 4, wherein the active material of the positive electrode is ferrous disulphide.

* * * * *